(12) United States Patent
Ciasulli et al.

(10) Patent No.: US 10,731,776 B2
(45) Date of Patent: Aug. 4, 2020

(54) MECHANICAL COUPLING FOR MECHANICAL AND STRUCTURAL TUBING

(71) Applicant: Victaulic Company, Easton, PA (US)

(72) Inventors: Andrew M. Ciasulli, Nazareth, PA (US); Scott D. Madara, Nazareth, PA (US)

(73) Assignee: Victaulic Company, Easton, PA (US)

( * ) Notice: Subject to any disclaimer, the term of this patent is extended or adjusted under 35 U.S.C. 154(b) by 74 days.

(21) Appl. No.: 15/879,939

(22) Filed: Jan. 25, 2018

(65) Prior Publication Data

US 2018/0216754 A1 Aug. 2, 2018

Related U.S. Application Data

(60) Provisional application No. 62/453,548, filed on Feb. 2, 2017, provisional application No. 62/482,376, filed on Apr. 6, 2017.

(51) Int. Cl.
*F16L 23/08* (2006.01)
*F16L 3/10* (2006.01)
(Continued)

(52) U.S. Cl.
CPC .......... *F16L 3/1016* (2013.01); *F16B 7/0426* (2013.01); *F16L 3/1091* (2013.01); *F16L 23/08* (2013.01); *F16L 3/127* (2013.01)

(58) Field of Classification Search
CPC ......... F16B 7/0426; F16L 17/04; F16L 23/08; F16L 21/065; F16L 37/091; F16L 2201/10; F16L 37/0925
See application file for complete search history.

(56) References Cited

U.S. PATENT DOCUMENTS 1,801,171 A 4/1931 Mueller et al.
2,201,372 A 5/1940 Miller
(Continued)

FOREIGN PATENT DOCUMENTS

CN 102906481 1/2013
DE 4117053 7/1994
(Continued)

OTHER PUBLICATIONS

Author Unknown; Victaulic 2×3/4 2"Pipe Fitting Tee Threaded Branch 3/4"NPT Outlet Twist-Lock Pin; www.bullseyeindustrialsales.com.

*Primary Examiner* — Bradley Duckworth
(74) *Attorney, Agent, or Firm* — Ballard Spahr LLP

(57) ABSTRACT

A coupling used to connect structural tubing includes segments surrounding a central space which receives the tubing. Teeth on an inner surface of the segments project toward the central space and form zones of deformation in the tubing upon engagement with the tubes' outer surfaces. Ends of the tubing abut one or more tongues on the inner surface, and observation apertures in the segments permit visual confirmation that the tubing is seated. Relief pockets on the inner surfaces of the segments receive portions of the tubing which deform outwardly. An insert may be present in the central space. The insert defines a space between itself and the inner surfaces of the segments which receives the tubing. The insert has relief channels which receive deformed regions of the tubing corresponding to the zones of deformation.

27 Claims, 7 Drawing Sheets

(51) Int. Cl.
*F16B 7/04* (2006.01)
*F16L 3/127* (2006.01)

(56) References Cited

U.S. PATENT DOCUMENTS

| | | | | |
|---|---|---|---|---|
| 3,013,821 A * | 12/1961 | Bogan | ............. | F16L 23/08 |
| | | | | 285/407 |
| 3,024,046 A * | 3/1962 | Frost | ............. | F16L 17/04 |
| | | | | 285/104 |
| 3,116,078 A * | 12/1963 | Scherer | ............. | F16L 17/04 |
| | | | | 285/104 |
| 3,963,268 A | 6/1976 | Widdicombe | | |
| 3,995,897 A | 12/1976 | Paskert | | |
| 4,417,755 A * | 11/1983 | Gittleman | ............. | F16L 21/065 |
| | | | | 285/367 |
| 4,443,029 A * | 4/1984 | Laxo | ............. | F16L 23/08 |
| | | | | 285/367 |
| 4,471,979 A * | 9/1984 | Gibb | ............. | F16L 17/04 |
| | | | | 285/112 |
| 5,240,294 A * | 8/1993 | Corcoran | ............. | F16L 17/04 |
| | | | | 285/373 |
| 6,170,884 B1 * | 1/2001 | McLennan | ............. | F16L 17/04 |
| | | | | 285/112 |
| 6,206,434 B1 * | 3/2001 | Schreiter | ............. | F16L 17/04 |
| | | | | 285/104 |
| 6,302,450 B1 * | 10/2001 | Dole | ............. | F16L 17/04 |
| | | | | 285/112 |
| 6,305,054 B1 * | 10/2001 | Imes | ............. | F01N 13/1805 |
| | | | | 24/276 |
| 6,581,977 B1 * | 6/2003 | Dole | ............. | F16L 17/04 |
| | | | | 285/112 |
| 6,824,172 B1 | 11/2004 | Komolrochanaporn | | |
| 6,886,844 B2 * | 5/2005 | Ritchey | ............. | B62K 15/00 |
| | | | | 280/278 |
| 7,798,535 B2 * | 9/2010 | Calhoun | ............. | F16L 13/06 |
| | | | | 285/328 |
| 7,988,207 B2 * | 8/2011 | Dole | ............. | F16L 17/04 |
| | | | | 285/112 |
| 9,285,060 B2 * | 3/2016 | Griggs, III | ............. | F16L 17/04 |
| 9,285,061 B2 | 3/2016 | Ikeda et al. | | |
| 9,500,307 B2 * | 11/2016 | Beagan, Jr. | ............. | F16L 21/065 |
| 9,528,642 B2 * | 12/2016 | Bancroft | ............. | F16L 17/04 |
| 10,107,428 B2 * | 10/2018 | Kim | ............. | F16L 21/08 |
| 10,190,707 B2 * | 1/2019 | Brandt | ............. | F16L 17/04 |
| 2003/0052747 A1 | 3/2003 | Gaukel | | |
| 2005/0253382 A1 | 11/2005 | Gibb | | |
| 2008/0284161 A1 * | 11/2008 | Dole | ............. | F16L 17/04 |
| | | | | 285/148.8 |
| 2009/0008929 A1 | 1/2009 | Person | | |
| 2009/0096209 A1 * | 4/2009 | Zilch | ............. | F16L 23/06 |
| | | | | 285/80 |
| 2018/0135786 A1 * | 5/2018 | Bourbon | ............. | F16L 23/04 |
| 2018/0163905 A1 | 6/2018 | Ohnemus et al. | | |
| 2018/0163906 A1 | 6/2018 | Ohnemus et al. | | |
| 2019/0086006 A1 * | 3/2019 | Nam | ............. | F16L 21/06 |

FOREIGN PATENT DOCUMENTS

| | | |
|---|---|---|
| GB | 1081702 | 8/1967 |
| JP | 2000320761 | 11/2000 |
| JP | 2001286350 | 10/2001 |
| JP | 2003074748 | 3/2003 |
| JP | 03694372 | 9/2005 |
| JP | 2015158214 | 9/2015 |

* cited by examiner

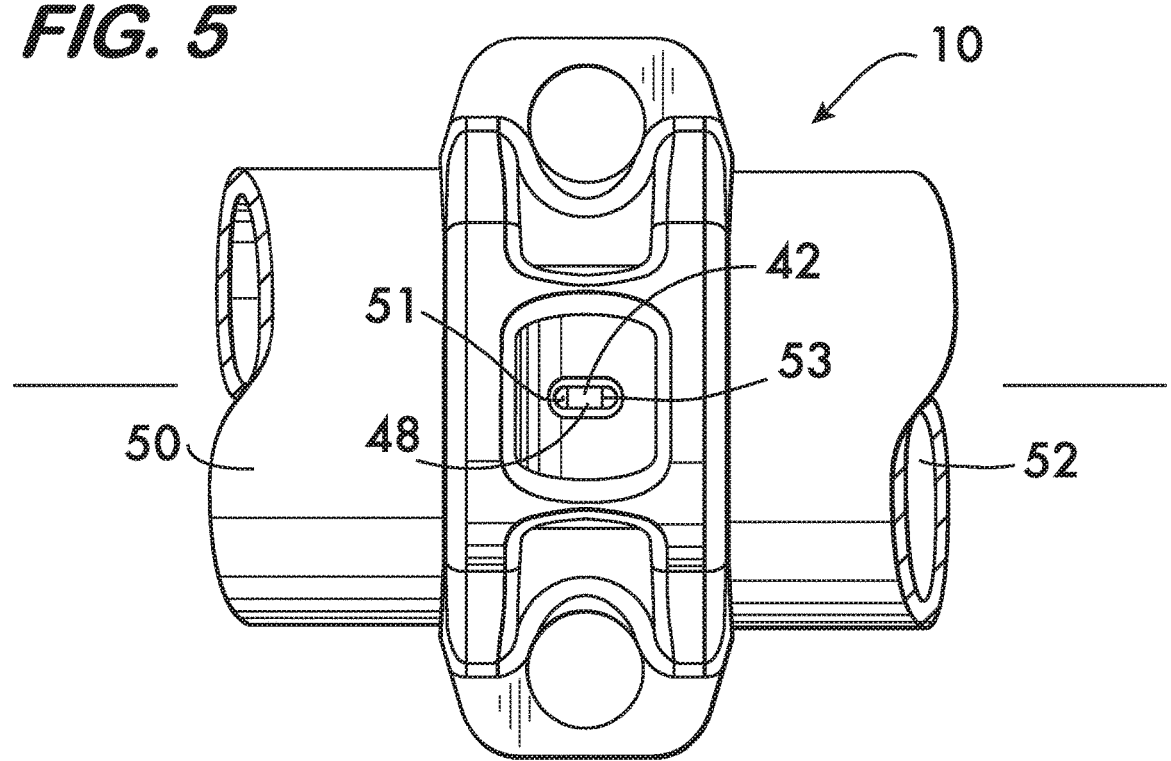
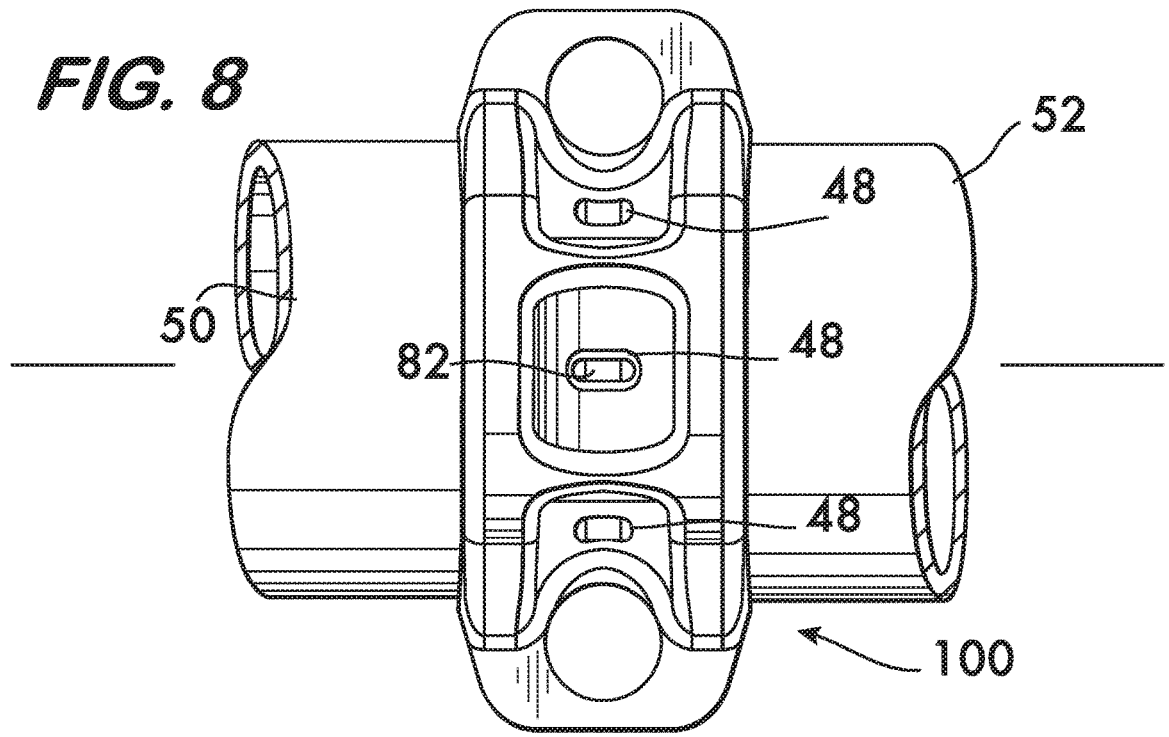

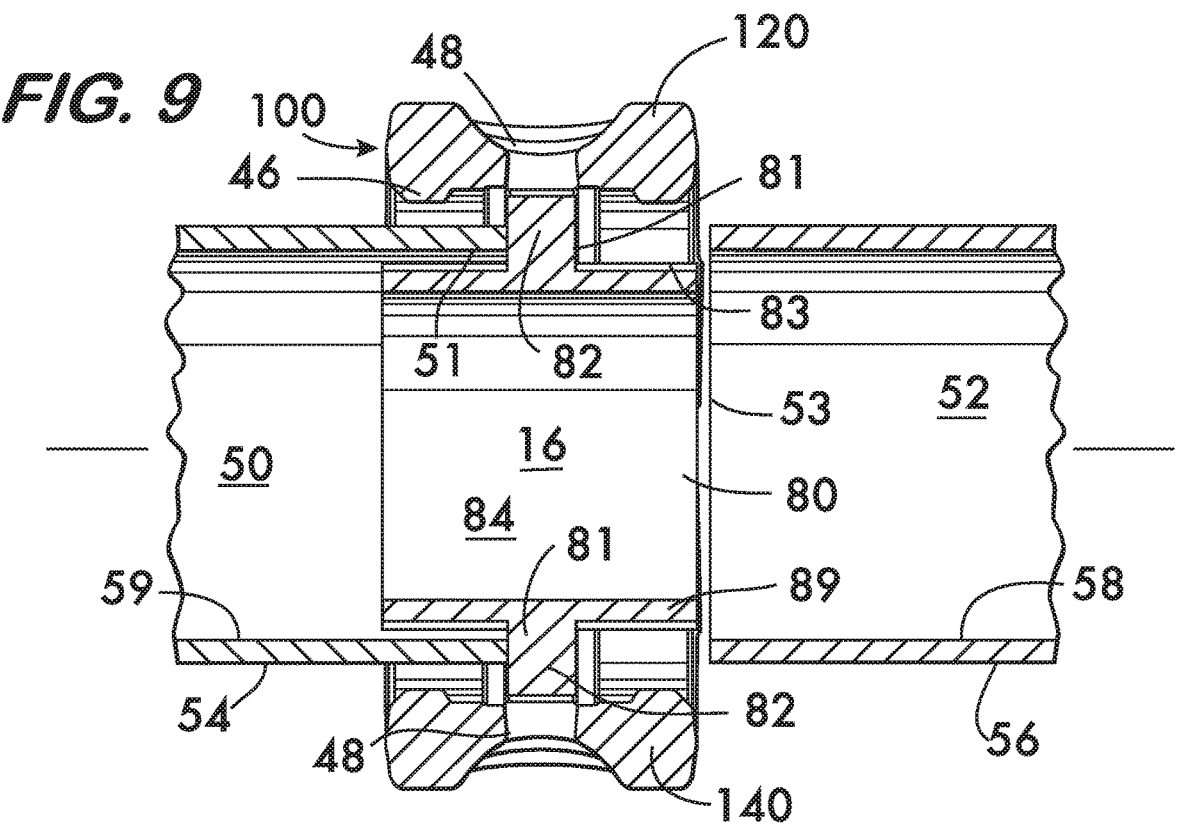
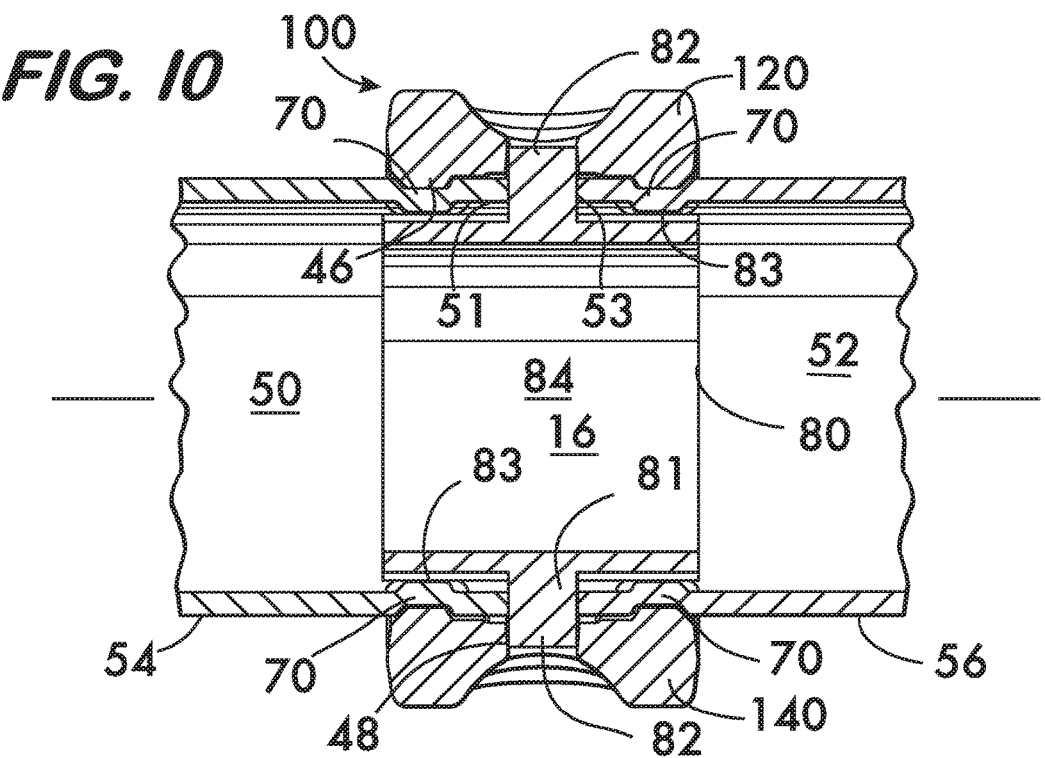

MECHANICAL COUPLING FOR MECHANICAL AND STRUCTURAL TUBING

CROSS REFERENCE TO RELATED APPLICATIONS

This application claims benefit of priority to US Provisional Application No. 62/453,548, filed Feb. 2, 2017, and to U.S. Provisional Application No. 62/482,376, filed Apr. 6, 2017, both provisional applications being hereby incorporated by reference.

FIELD OF THE INVENTION

This invention relates to couplings for joining mechanical and structural tubing.

BACKGROUND

Hollow steel tubing in common geometric shapes, including rounds, squares, rectangles, and polygons (such as octagons), are used for the construction of a wide variety of structures, from industrial fencing and light-duty structures such as carports or recreational equipment, to buildings, towers, and trusses of all types. Such construction tubing, commonly called structural tubing or mechanical tubing (depending on the standards to which they comply), is also used for supports of all types, including for signs, solar panels, and solar racking. Use of construction tubing for any structure often requires connection of the individual construction tubing segments to each other, including where they are connected in a coaxial, in-line manner. Such connections are typically made by welding, which is time-consuming, and requires skilled welders to be available at the jobsite. Gusseted and bolted connections are also used; however, such connections still require welding of the gussets to the construction tubing at a fabrication facility, though the later field-assembly may be done with bolts. As many of the possible defects of a welded joint may not be visible to the naked eye, additional quality checks of welded joints, whether for gussets or for field welded connections, is often required. There is clearly an opportunity to improve the coaxial jointing of construction tubing by using a mechanical joint that does not require shop or field welding to complete the joint.

SUMMARY

One aspect of the invention concerns pre-assembled couplings for joining construction tube elements together in end to end relationship. An example embodiment of such a coupling comprises a plurality of segments connected end to end surrounding a central space. Each segment has attachment members at opposite ends thereof for adjustably connecting one segment to another. Each segment has an inner surface facing the central space. At least one tongue is positioned on the inner surface of at least one of the segments. The at least one tongue projects toward the central space. A plurality of teeth are positioned on the inner surface of each segment. The teeth project toward the central space. A plurality of spacers are positioned between the segments. The spacers maintain the segments in spaced apart relation about the central space. In an example embodiment, the spacers are adapted to maintain the segments in the spaced apart relation sufficient to permit the construction tube elements to be inserted into the central space.

In one example embodiment, the attachment members comprise a plurality of fasteners extending between the segments. In this example, each spacer surrounds at least a portion of a respective one of the fasteners. The fasteners may comprise nuts and bolts for example. Further by way of example, the attachment members may include a plurality of lugs. Each lug defines a hole for receiving one of the fasteners. In an example embodiment, at least one of the lugs on at least one of the segments comprises a pair of protrusions extending therefrom. Another of the lugs on another of the segments defines a recess adapted to receive the protrusions.

By way of example, the at least one tongue comprises a plurality of discrete projections. In a further example, the at least one tongue extends lengthwise along the segment along the inner surface. In an additional example, the at least one tongue is positioned midway between opposite sides of the at least one segment.

First and second relief grooves may be positioned in the inner surface on opposite sides of the at least one tongue, the relief grooves extending lengthwise along the segment in an example embodiment. In a further example, at least one observation aperture is positioned in at least one of the segments.

An example embodiment may comprise first and second relief pockets positioned at opposite ends of each the segment. Each relief pocket is formed in the inner surface in this example.

An example coupling embodiment may further comprise an insert body positioned within the central space. The insert body defines a space between the insert body and the inner surfaces of the segments for receiving the construction tube elements. In a specific example, the insert body comprises a barrel having a cylindrical shape. Further by way of example, the barrel may define a bore. Additionally by way of example, the insert body may comprise first and second locating tabs positioned diametrically opposite one another and projecting outwardly from the barrel. In another example, the insert body comprises a flange extending circumferentially around the barrel. In an example embodiment, the insert body may define a plurality of channels extending longitudinally along the barrel. A particular example embodiment of a pre-assembled coupling according to the invention may comprise no more than two of the segments.

The invention also encompasses a coupling for joining construction tube elements. In an example coupling each tube element has an end engageable with the coupling. By way of example the coupling comprises a plurality of segments connected end to end surrounding a central space. Each segment has attachment members at opposite ends thereof for adjustably connecting one segment to another. Each segment has an inner surface facing the central space. At least one tongue is positioned on the inner surface of at least one of the segments. The at least one tongue projects toward the central space and is engageable with the ends of the tube elements when the tube elements are received within the central space. A plurality of teeth are positioned on the inner surfaces of each of the segments. The teeth project toward the central space.

In an example embodiment, the attachment members comprise a plurality of fasteners extending between the segments. In a specific example the fasteners comprise nuts and bolts. Further by way of example, the attachment members include a plurality of lugs. Each lug defines a hole for receiving one of the fasteners. In an example embodiment, at least one of the lugs on at least one of the segments comprises a pair of protrusions extending therefrom, and another of the lugs on another of the segments defines a recess adapted to receive the protrusions.

In an example embodiment, the at least one tongue comprises a plurality of discrete projections. Further by way of example, the at least one tongue extends lengthwise along the segment along the inner surface. In another example, the at least one tongue is positioned midway between opposite sides of the at least one segment. An example coupling may further comprise first and second relief grooves in the inner surface positioned on opposite sides of the at least one tongue. The relief grooves extend lengthwise along the segment in this example.

An example coupling embodiment may further comprise at least one observation aperture positioned in at least one of the segments. By way of example, first and second relief pockets may be positioned at opposite ends of each the segment. Each relief pocket is formed in the inner surface in this example.

An example coupling may further comprise an insert body positioned within the central space. The insert body defines a space between the insert body and the inner surfaces of the segments for receiving the construction tube elements. In one example, the insert body comprises a barrel having a cylindrical shape. Further by way of example, the barrel defines a bore. In another example embodiment, the insert body comprises first and second locating tabs positioned diametrically opposite one another and projecting outwardly from the barrel.

Further by way of example, the insert body may comprise a flange extending circumferentially around the barrel. In another example, the insert body defines a plurality of channels extending longitudinally along the barrel. In a specific example, the coupling according to the invention comprises no more than two of the segments.

The invention further encompasses a joint. In one example embodiment, the joint comprises a coupling having first and second segments connected to one another end to end surrounding a central space. Each segment comprises an inner surface facing the central space. A plurality of teeth are positioned on the inner surfaces of the first and second segments. The teeth project toward the central space. A first construction tube element is positioned within the central space. A second construction tube element is positioned within the central space. The plurality of teeth engage outer surfaces of the first and second construction tube elements, each tooth forming a respective zone of deformation at a point of contact between each tooth and the outer surfaces of the first and second construction tube element. The zones of deformation comprise respective portions of the first and second construction tube elements which are deformed toward the central space.

In an example embodiment the joint may further comprise at least one tongue positioned on the inner surface of at least one of the segments. The at least one tongue projects toward the central space. The first construction tube element has an end abutting the at least one tongue from a first side thereof. The second construction tube element has an end abutting the at least one tongue from a second side thereof opposite to the first side. By way of example, at least one observation aperture is located in at least one of the segments. Ends of the first and second construction tube elements are visible through the at least one observation aperture.

An example joint may further comprise first and second relief pockets positioned at opposite ends of each segment. Each relief pocket is formed in the inner surface of each the segment. Portions of the first and second construction tube elements are deformed away from the central space and project into each the relief pocket.

An example joint may further comprise an insert body positioned within the central space. The insert body comprises a barrel having a cylindrical shape. The barrel defines an annular space between the insert body and the inner surfaces of the segments. The construction tube elements are received within the annular space. Further by way of example, the insert body may comprise first and second locating tabs positioned diametrically opposite one another and projecting outwardly from the barrel. The first tab engages a first observation aperture in the first segment, the second tab engages a second observation aperture in the second segment. In another example embodiment, the insert body comprises a flange extending circumferentially around the barrel. The first construction tube element has an end abutting the flange from a first side thereof, the second construction tube element having an end abutting the flange from a second side thereof opposite to the first side. In a further example embodiment, the insert body defines a plurality of channels extending longitudinally along the barrel. Each zone of deformation projects into a respective one of the channels.

The invention further encompasses a method of forming a joint between first and second construction tube elements. One example embodiment of the method comprises:
  inserting the first and second construction tube elements into a central space surrounded by first and second segments;
  drawing the first and second segments toward the central space;
  deforming the construction tube elements toward the central space at respective points of contact between teeth on inner surfaces of the segments and outer surfaces of the first and second construction tube elements.

The example method may further comprise abutting respective ends of the first and second construction tube elements with at least one tongue projecting outwardly from the inner surface of at least one of the segments.

The example method may further comprise deforming portions of the first and second construction tube elements away from the central space, the portions engaging relief pockets being positioned at opposite ends of the first and second segments.

The example method may further comprise positioning the first and second construction tube elements within an annular space formed between an insert body within the central space and the inner surfaces of the segments.

The example method may further comprise locating the insert body within the central space by engaging first and second locating tabs projecting outwardly from the insert body with respective first and second observation apertures in the first and second segments.

The example method may further comprise abutting respective ends of the first and second construction tube elements with a flange extending around the insert body.

The example method may further comprise engaging portions of the first and second construction tube elements with longitudinal channels formed in the insert body at the points of contact between the teeth on the inner surfaces of the segments and the outer surfaces of the first and second construction tube elements.

BRIEF DESCRIPTION OF THE DRAWINGS

FIG. 5 is an exterior view of an example construction tube joint formed using the coupling shown in FIG. 1;

FIG. 8 is an exterior view of an example construction tube joint formed using the coupling shown in FIG. 6;

FIG. 9 is a longitudinal sectional view of the coupling shown in FIG. 6 in a pre-assembled state receiving construction tubes;

FIG. 10 is a longitudinal sectional view of a joint formed by the coupling shown in FIG. 6;

DETAILED DESCRIPTION

Figure 1:
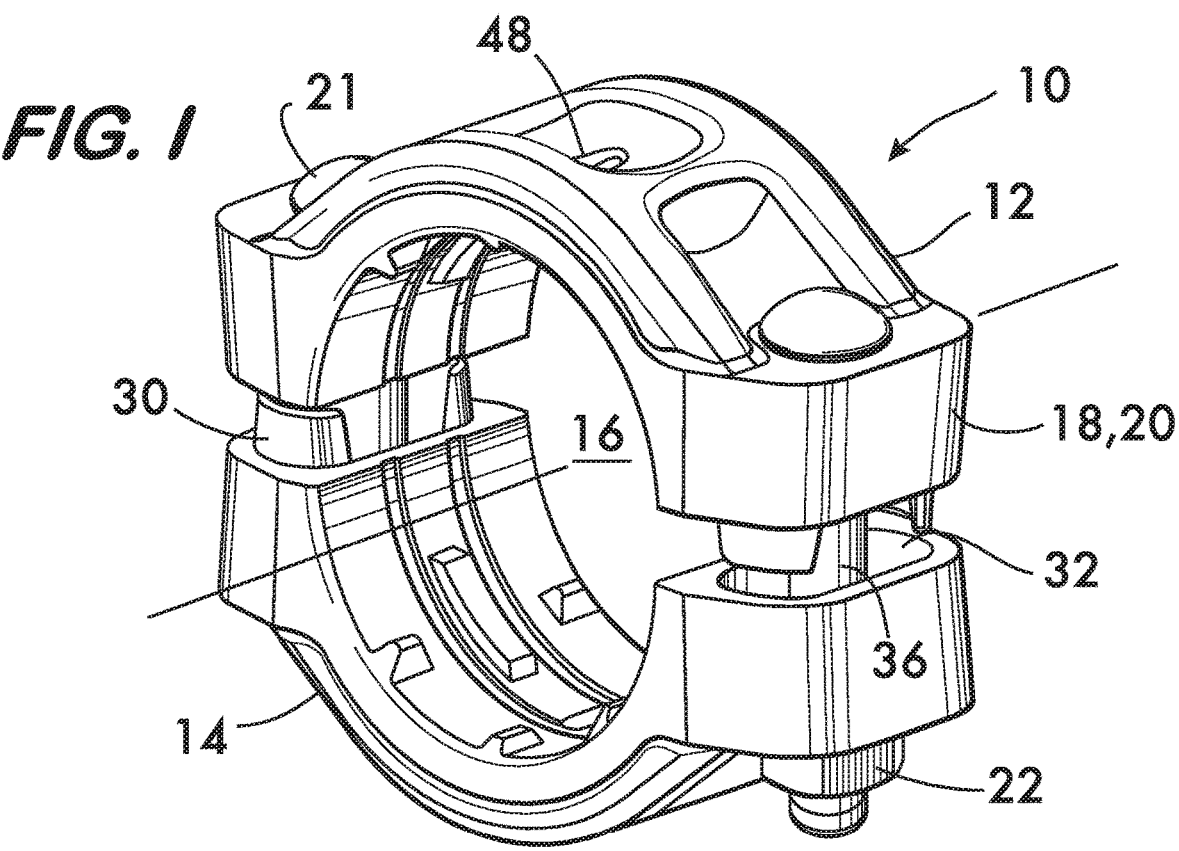
FIG. 1 is an isometric view of an example coupling according to the invention, shown in a pre-assembled state.

FIG. 1 depicts an example mechanical coupling 10 according to the invention. Coupling 10 comprises two segments 12 and 14 connected end-to-end and surrounding central space 16. Attachment members 18, in this example comprising bolting lugs 20, allow the segments to be adjustably connected together by fasteners, such as by bolts 21 and nuts 22. Each segment 12, 14 further comprises protrusions 30 and recesses 32. Spacers 36 surround bolts 21 in between segments 12, 14 and act to support segments 12 and 14 in spaced relation in a pre-assembled state.

Figure 2:
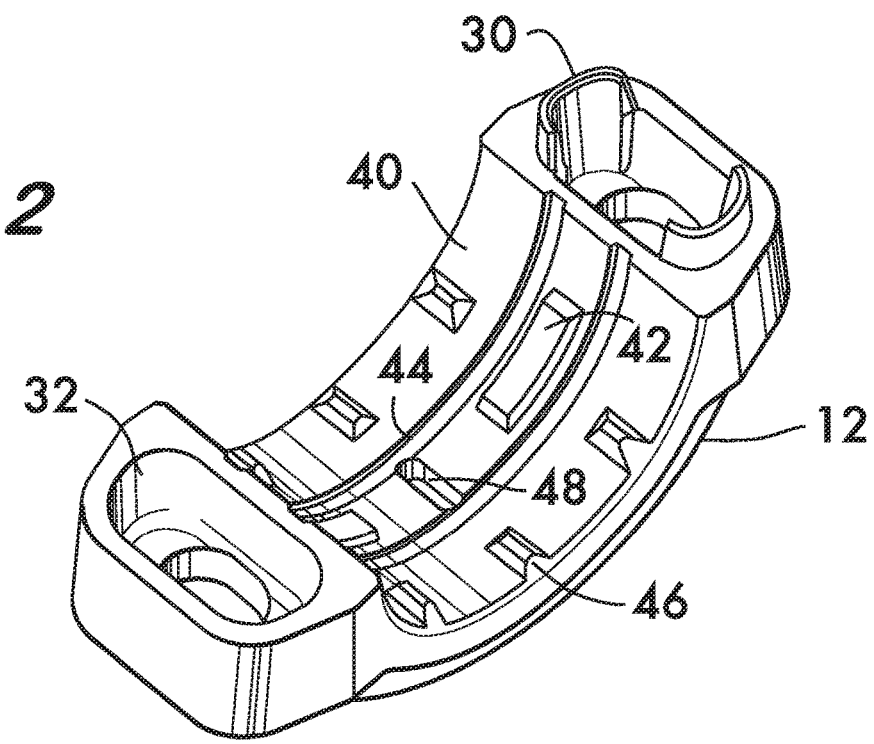
FIG. 2 is an isometric view of a an example segment of a coupling according to the invention.

As shown in FIGS. 1 and 2, each segment 12, 14 (segment 12 shown) has an inner surface 40. Tongue 42 projects radially inwardly from inner surface 40 towards the central space 16. Tongue 42 may extend continuously about the inner surface 40 or it may comprise discrete projections (as depicted in FIG. 2). Adjacent to tongue 42 are relief grooves 44, which extend outwardly, away from the central space and thus into inner surface 40. Grooves 44 provide relief to accept any end flare of the construction tube elements when they are deformed as described below. A plurality of teeth 46 project inwardly from the inner surface 40 toward the central space 16. One or more observation apertures 48 are situated on tongue 42 when tongue 42 is continuous, or in between the discrete projections when tongue 42 is comprised of discrete projections (as shown).

Figure 3:
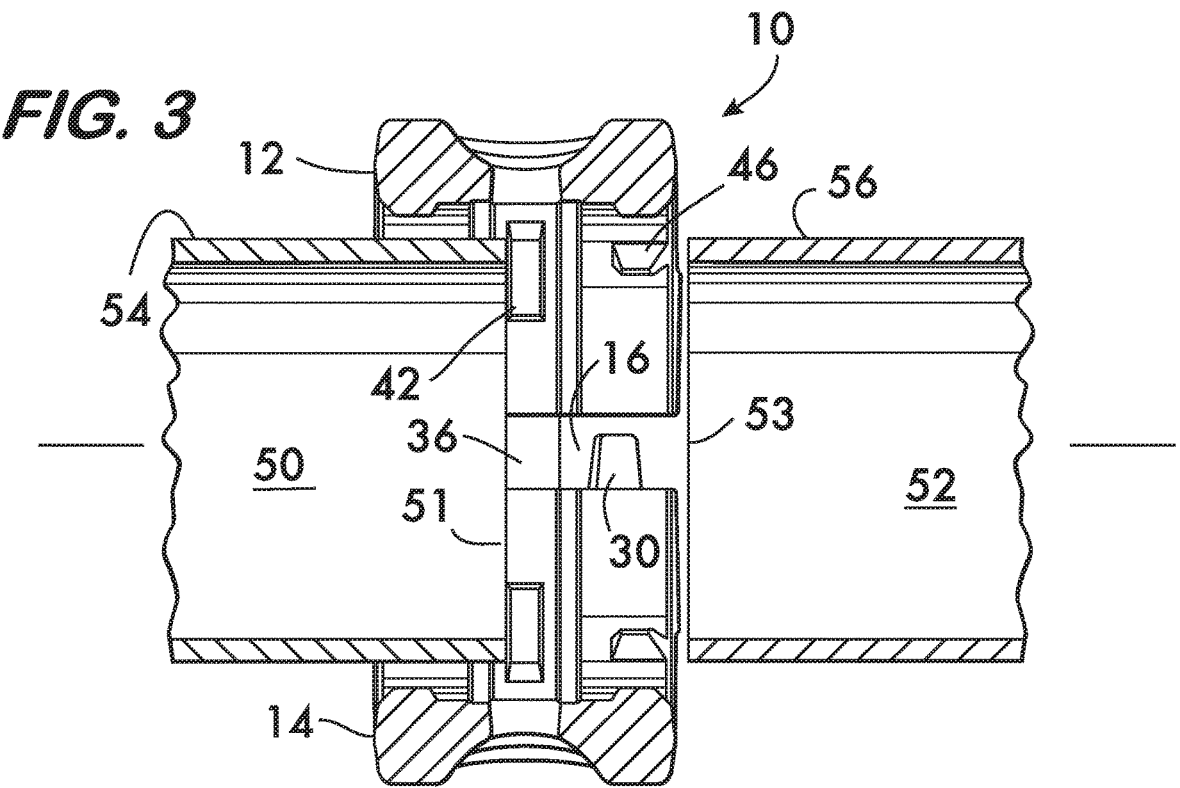
FIG. 3 is a longitudinal sectional view of an example coupling in a pre-assembled state receiving construction tubes.
Figure 4:
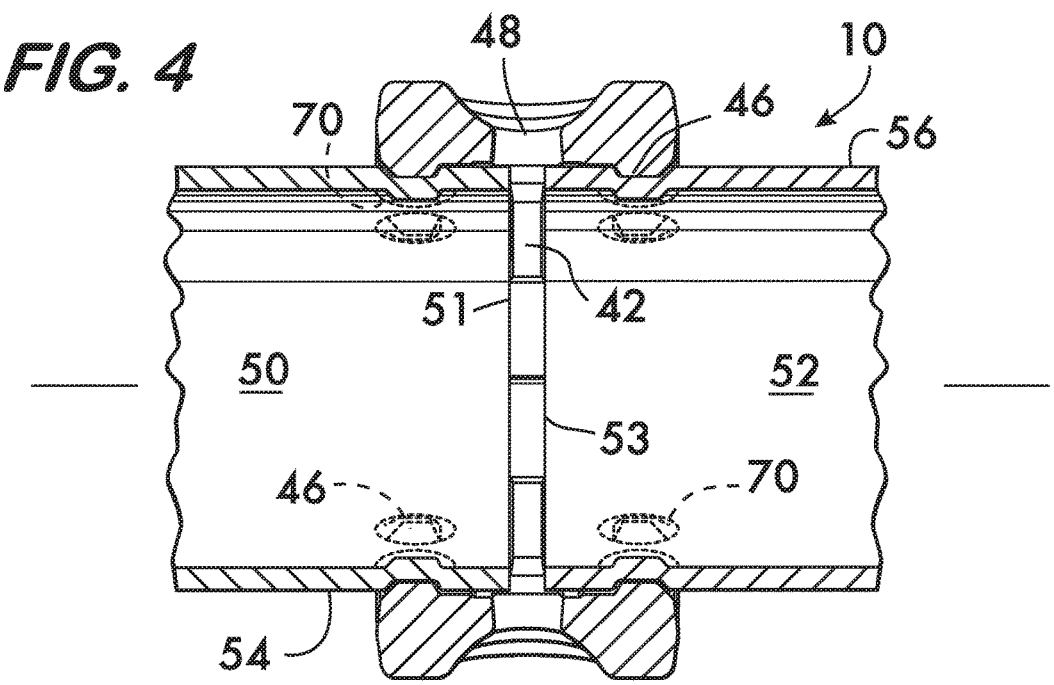
FIG. 4 is a longitudinal sectional view of a joint formed by an example coupling according to the invention.

As shown in FIG. 3, when used to join construction tube elements 50 and 52, coupling 10 is provided to the users in the pre-assembled state, with segments 12, 14 connected to each other at connection members 18 by bolts 21 and nuts 22 (see FIG. 1). Spacers 36 hold segments 12, 14, in spaced relation about central space 16 sufficient to allow an end 51 of construction tube 50 to pass between segments 12, 14 (including protruding teeth 46), enter the central space 16 and abut tongue 42. End 53 of construction tube 52 is also inserted into central space 16 such that it faces end 51 of construction tube 50 and also abuts tongue 42. The assembly of bolts 21 and nuts 22 (see FIG. 1) is then tightened, progressively collapsing spacers 36 and bringing segments 12 and 14 toward one another, locating projections 30 within recesses 32 and bringing teeth 46 into firm contact with the outer surfaces 54 and 56 of construction tubes 50 and 52, respectively. As shown in FIGS. 1 and 4, continued tightening of the assembly of bolts 21 and nuts 22 results in zones of localized deformation 70 of construction tubes 50 and 52 at the point of contact with each of teeth 46. These zones of localized deformation 70 ensure firm, biting contact between the coupling 10 and construction tubes 50 and 52, increasing the tensile resistance as well as the torsional and bending rigidity of the joint created by coupling 10. The abutting contact of each of the ends 51, 53 of construction tubes 50, 52 with tongue 42 allows compressive loads to be carried directly through tongue 42.

FIG. 5 depicts the completed assembly of the coupling 10 to construction tubes 50 and 52 as viewed from a position looking directly at observation aperture 48. As seen in FIG. 5, observation apertures 48 allow the user to visually verify the location of, and thus the abutment of, the ends 51, 53 of structural tubes 50, 52 with tongue 42.

Figure 6:
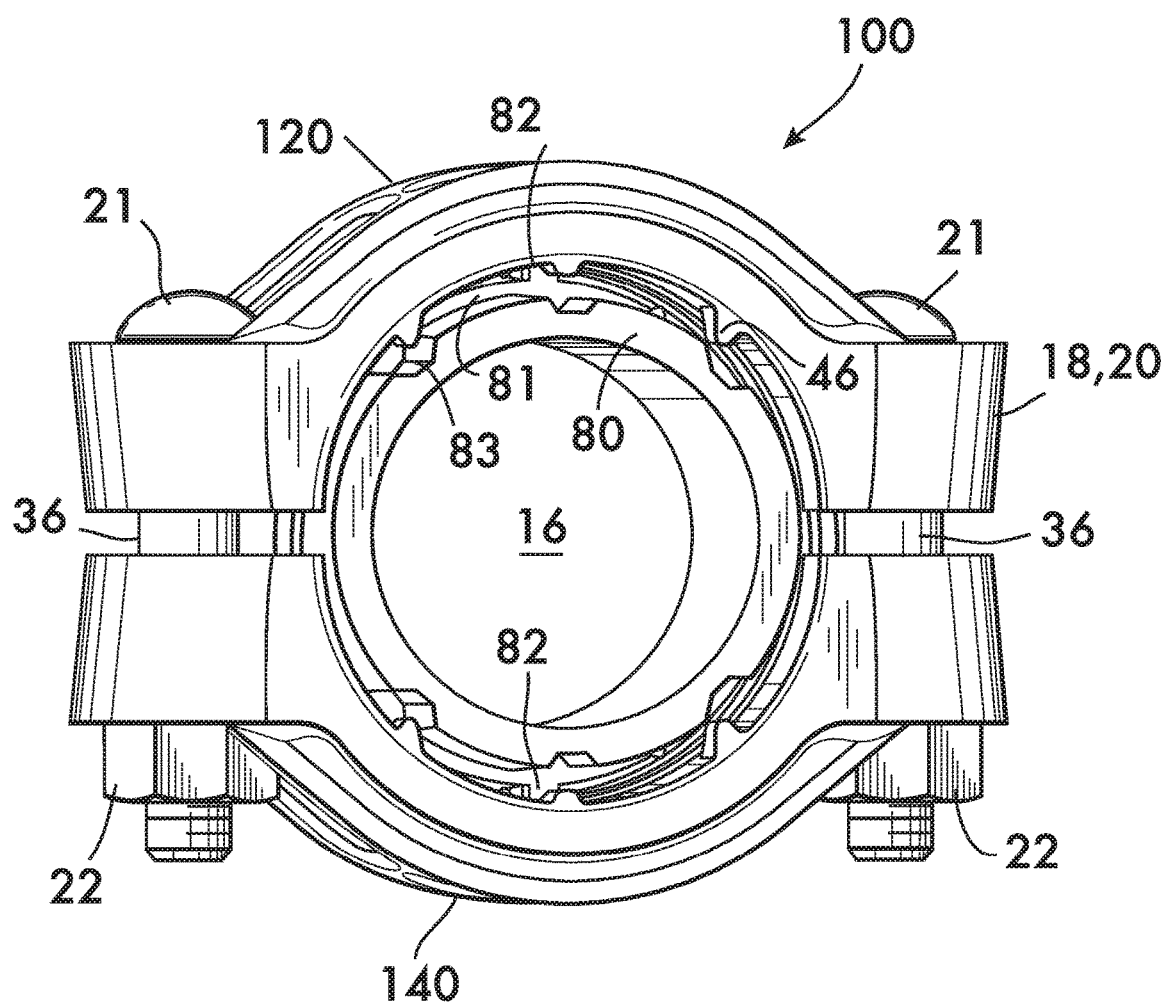
FIG. 6 is an isometric view of an example embodiment of another coupling according to the invention shown in a pre-assembled state.
Figure 7:
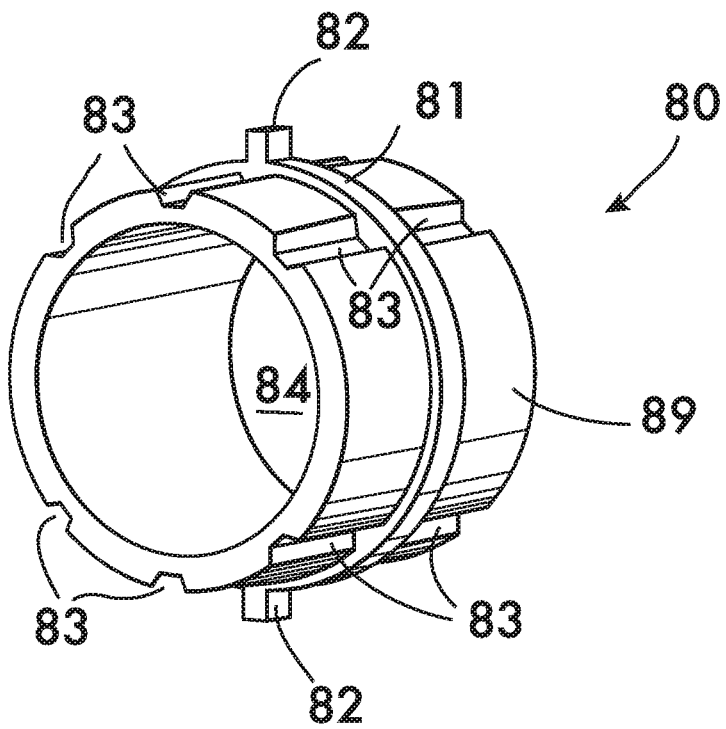
FIG. 7 is an isometric view of an example insert used with the coupling shown in FIG. 6.

In another example embodiment, shown in FIGS. 6 and 9, a coupling 100 according to the invention comprising segments 120 and 140 may be used with an insert body 80 designed to be received within the ends 51 and 53 of tubes 50 and 52. As further explained below, insert body 80 acts as a support for the inside surfaces 58 and 59 of tubes 50 and 52 respectively. As best seen in FIG. 7, insert body 80 comprises a barrel 89, with a flange 81 projecting radially about the circumference of barrel 89. Locating tabs 82 project radially outwards from the flange 81. Channels 83 are located upon barrel 89 at spacing designed to correspond with the location of teeth 46 of segments 120, 140 (see FIG. 6).

Coupling 100 may be provided to the users in the preassembled condition shown in FIG. 6, with segments 120, 140 connected to each other at connection members 18 by bolts 21 and nuts 22. Insert body 80 is located within central space 16. In an example embodiment, locating features such as locating tabs 82 serve to locate and center insert body 80 between segments 120, 140 within the central space 16. In the embodiment seen in FIG. 8, locating tabs 82 may engage one or more observation apertures 48, which engagement serves to locate and center insert body 80 prior to and during assembly, while also allowing the user to verify the location and orientation of insert body 80 within joint after assembly. Additional observation apertures 48, not occupied by locating tabs 82, may be provided to allow the user to verify the location of the construction tubes 50, 52 within the assembled joint as generally described above. As may be seen in FIGS. 6 and 9, segments 120, 140 are held in spaced relation about central space 16 by spacers 36 sufficient to allow an end 51 of construction tube 50 to pass between segments 120, 140 (including protruding teeth 46) and over barrel 89 of insert body 80 such that construction tube 50 enters the central space 16 and end 51 abuts flange 81. In a similar manner, end 53 of construction tube 52 is then passed into central space 16 over barrel 89 such that it faces end 51 of construction tube 50 and also abuts flange 81. The assembly of bolts 21 and nuts 22 is then tightened, progressively collapsing spacers 36 and bringing segments 120 and 140 toward one another, as well as locating projections 30 within recesses 32 (see FIG. 6) and bringing teeth 46 into firm contact with the outer surfaces 54 and 56 of construction tubes 50 and 52, respectively. As shown in FIG. 10, continued tightening of the assembly of bolts 21 and nuts 22 results in zones of localized deformation 70 of construction tubes 50 and 52 at the point of contact with each of teeth 46, which zones of localized deformation 70 are forced into channels 83 of insert body 80. In this embodiment, each segment 120, 140 may lack the tongue 42 (see FIG. 3), and compressive load through construction tubes 50, 52 may instead be carried by the abutting contact of each of the ends 51, 53 of construction tubes 50, 52 with flange 81 of insert body 80.

The use of insert body 80 having channels 83 increases the tensional resistance, the bending rigidity, and especially the torsional rigidity of the joint created by coupling 100 as not only are the teeth 46 clamped into firm, biting contact with the outer surfaces 54 and 56 of construction tubes 50 and 52, but the zones of localized deformation are also pushed into channels 83, increasing the mechanical interlock between the coupling 100 and the construction tubes 50 and 52. While insert body 80 is depicted having a bore 84 (see FIG. 7) it may also comprise a solid member lacking bore 84, it being the case that the diameter of bore 84 affects the stiffness of insert body 80, and thus of the amount of support insert body 80 can provide to construction tubes 50, 52 as they are deformed by segments 120 and 140.

Figure 11:
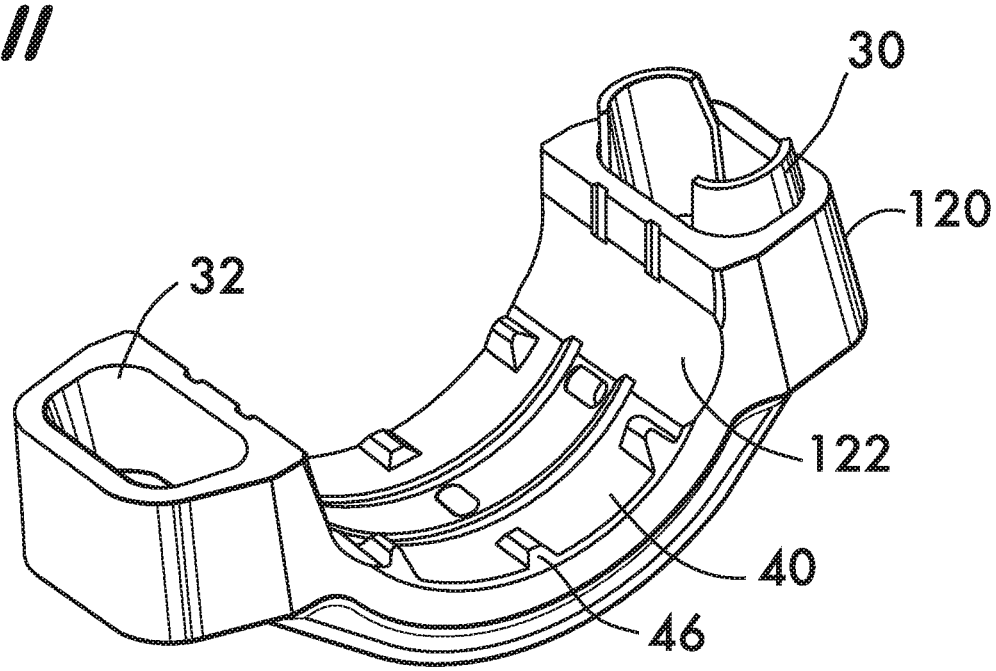
FIG. 11 is an isometric view of an example embodiment of another coupling segment according to the invention.
Figure 12:
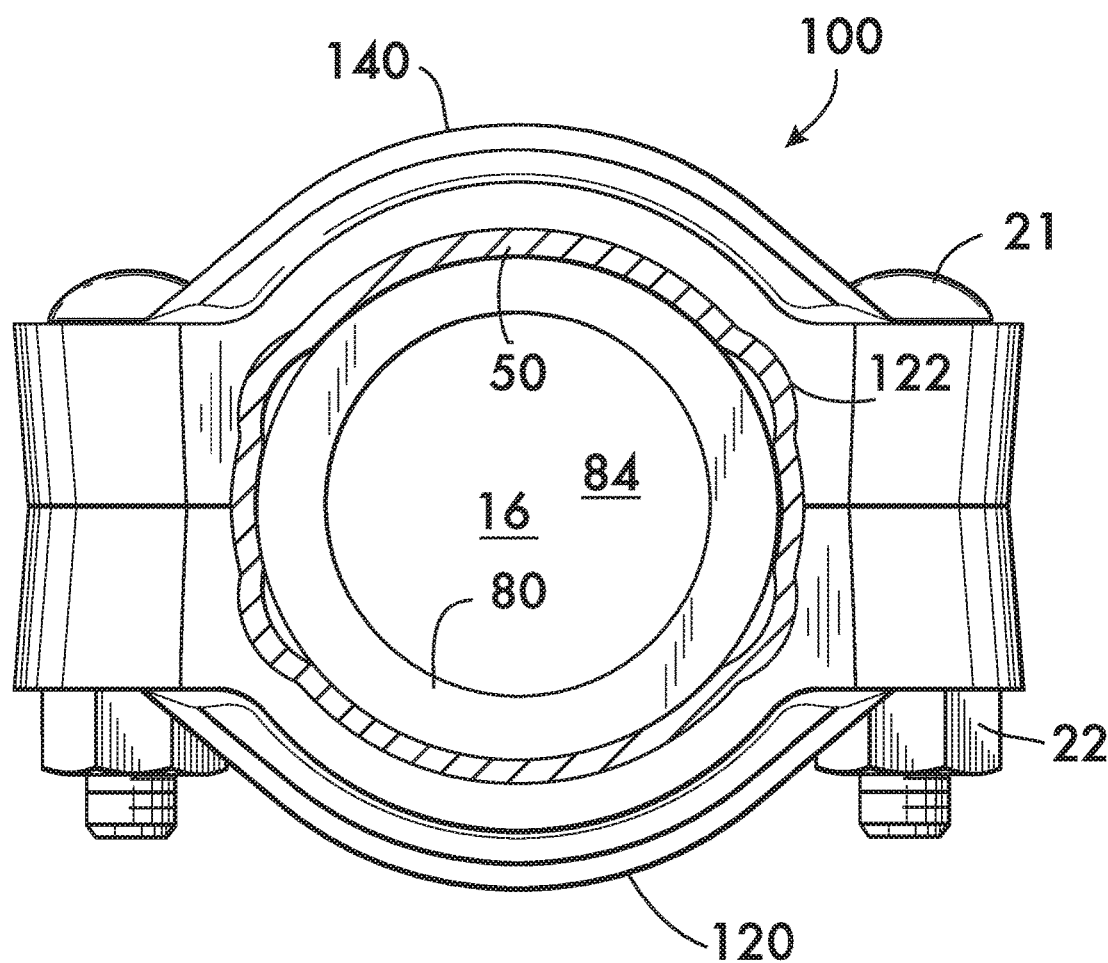
FIG. 12 is an axial view of an assembled mechanical coupling according to the invention using coupling segments shown in FIG. 11.

As shown in FIGS. 9 and 11, when using coupling 100 with insert body 80, it is advantageous for relief pockets 122 to be provided on the inner surface 40 of segments 120 and 140. Relief pockets 122 are depicted by way of example on segment 120 shown in FIG. 11. As can be best seen in FIG. 12 (exaggerated for clarity), relief pockets 122 provide clearance for the material comprising construction tubes 50 and 52 to flow into as they are deformed by teeth 46. Construction tubes 50 and 52 are constrained between segments 120, 140 and insert body 80 when bolts 21 and nuts 22 are tightened, thereby creating the joint comprising coupling 100. By allowing a small amount of controlled outward deformation of construction tubes 50 and 52 into relief pockets 122, the mechanical interlock of the construction tubes 50 and 52 and coupling 100 is further enhanced, further improving resistance to torsional forces acting upon the joint.

While the couplings 10 and 100 according to the invention are shown in example embodiments depicted on construction tubing that is circular in cross-section, couplings according to the invention can be used on construction tubing of other closed shapes, such as squares and polygons as known in the art, by conforming the shape of the segments (and thus of inner surface 40) to shape of the tubing. Additionally, though couplings 10 and 100 are shown in example embodiments comprising two coupling segments, it may be desirable for the coupling to comprise more than two segments connected end to end. This may be particularly advantageous when joining construction tube that is non-round in cross-section. For instance, when joining construction tube that is square in cross-section, it may be desirable for the coupling to comprise four segments that are connected end to end by fasteners located near the corners of the square construction tube.

The couplings according to the invention are expected to provide a joint for construction tubes that neither requires field nor shop welding, but that can carry high compressive, tensile and torsional loads.

What is claimed is:

1. A pre-assembled coupling for joining construction tube elements together in end to end relationship, said coupling comprising:
   a plurality of segments connected end to end surrounding a central space, each said segment having attachment members at opposite ends thereof for adjustably connecting one segment to another, each said segment having an inner surface facing said central space;
   a unitary insert body positioned within said central space, said insert body having a first end adapted to be received within a first one of said tube elements, and a second end, oppositely disposed and adapted to be received within a second one of said tube elements, said first and second ends of said insert body defining respective spaces between said insert body and said inner surfaces of said segments for receiving said construction tube elements;
   a plurality of teeth positioned on said inner surface of each said segment, said teeth projecting toward said central space;
   a plurality of spacers positioned between said segments, said spacers maintaining said segments in spaced apart relation about said central space.

2. The pre-assembled coupling according to claim 1, wherein said attachment members comprise a plurality of fasteners extending between said segments, each said spacer surrounding at least a portion of a respective one of said fasteners.

3. The pre-assembled coupling according to claim 2, wherein said fasteners comprise nuts and bolts.

4. The pre-assembled coupling according to claim 2, wherein said attachment members include a plurality of lugs, each said lug defining a hole for receiving one of said fasteners.

5. The pre-assembled coupling according to claim 4, wherein at least one of said lugs on at least one of said segments comprises a pair of protrusions extending therefrom, and another of said lugs on another of said segments defines a recess adapted to receive said protrusions.

6. The pre-assembled coupling according to claim 1, wherein said spacers are adapted to maintain said segments in said spaced apart relation sufficient to permit said construction tube elements to be inserted into said central space.

7. The pre-assembled coupling according to claim 1, further comprising at least one observation aperture positioned in at least one of said segments.

8. The pre-assembled coupling according to claim 1, further comprising first and second relief pockets positioned at opposite ends of each said segment, each said relief pocket formed in said inner surface.

9. The pre-assembled coupling according to claim 1, wherein said insert body comprises a barrel having a cylindrical shape.

10. The pre-assembled coupling according to claim 9, wherein said barrel defines a bore.

11. The pre-assembled coupling according to claim 9, wherein said insert body comprises first and second locating tabs positioned diametrically opposite one another and projecting outwardly from said barrel.

12. The pre-assembled coupling according to claim 9 wherein said insert body comprises a flange extending circumferentially around said barrel.

13. The pre-assembled coupling according to claim 9, wherein said insert body defines a plurality of channels extending longitudinally along said barrel.

14. The pre-assembled coupling according to claim 1, comprising no more than two of said segments.

15. A coupling for joining construction tube elements, each said tube element having an end engageable with said coupling, said coupling comprising:
   a plurality of segments connected end to end surrounding a central space, each said segment having attachment members at opposite ends thereof for adjustably connecting one segment to another, each said segment having an inner surface facing said central space;

a unitary insert body positioned within said central space, said insert body having a first end adapted to be received within a first one of said tube elements, and a second end, oppositely disposed and adapted to be received within a second one of said tube elements, said first and second ends of said insert body defining respective spaces between said insert body and said inner surfaces of said segments for receiving said construction tube elements;

a plurality of teeth positioned on said inner surfaces of each of said segments, said teeth projecting toward said central space.

16. The coupling according to claim 15, wherein said attachment members comprise a plurality of fasteners extending between said segments.

17. The coupling according to claim 16, wherein said fasteners comprise nuts and bolts.

18. The coupling according to claim 16, wherein said attachment members include a plurality of lugs, each said lug defining a hole for receiving one of said fasteners.

19. The coupling according to claim 18, wherein at least one of said lugs on at least one of said segments comprises a pair of protrusions extending therefrom, and another of said lugs on another of said segments defines a recess adapted to receive said protrusions.

20. The coupling according to claim 15, further comprising at least one observation aperture positioned in at least one of said segments.

21. The coupling according to claim 15, further comprising first and second relief pockets positioned at opposite ends of each said segment, each said relief pocket formed in said inner surface.

22. The coupling according to claim 15, wherein said insert body comprises a barrel having a cylindrical shape.

23. The coupling according to claim 22, wherein said barrel defines a bore.

24. The coupling according to claim 22, wherein said insert body comprises first and second locating tabs positioned diametrically opposite one another and projecting outwardly from said barrel.

25. The coupling according to claim 22 wherein said insert body comprises a flange extending circumferentially around said barrel.

26. The coupling according to claim 22, wherein said insert body defines a plurality of channels extending longitudinally along said barrel.

27. The coupling according to claim 15, comprising no more than two of said segments.

* * * * *